United States Patent [19]

Shigemori et al.

[11] Patent Number: 4,628,399

[45] Date of Patent: Dec. 9, 1986

[54] ANTI-OVERVOLTAGE PROTECTOR

[75] Inventors: Daizo Shigemori, Sagamihara; Yuji Muramatsu, Tokyo, both of Japan

[73] Assignee: Kabushiki Kaisha Sankosha, Tokyo, Japan

[21] Appl. No.: 716,879

[22] Filed: Mar. 27, 1985

[51] Int. Cl.[4] .......................... H02H 9/04; H01T 2/02

[52] U.S. Cl. .................................... 361/120; 361/117; 313/602; 313/325

[58] Field of Search ............... 313/306, 307, 308, 602, 313/603, 581, 325; 361/117, 120, 129, 130

[56] References Cited

U.S. PATENT DOCUMENTS

| | | | |
|---|---|---|---|
| 3,588,576 | 6/1971 | Kawiecki | 361/130 |
| 3,989,985 | 11/1976 | Lange et al. | 361/120 |
| 4,175,277 | 11/1979 | Zuk | 361/120 |

*Primary Examiner*—A. D. Pellinen
*Assistant Examiner*—H. L. Williams
*Attorney, Agent, or Firm*—Schwartz, Jeffery, Schwaab, Mack, Blumenthal & Evans

[57] ABSTRACT

A pair of main electrodes are hermetically mounted, by fusion of a low melting point metal, onto both end openings of an insulative cylindrical member, respectively. Main electric discharge surfaces of the electrodes oppose each other in said cylindrical member with a gap interposed therebetween. A recessed portion is provided in the main electric discharge surface of one of the pair of main electrodes. A pair of trigger electrodes are conductively connected to the pair of main electrodes, and oppose each other in the recessed portion to thereby form a trigger electric discharge gap therebetween. The pair of main electrodes are formed of electrically conductive material having a thermal coefficient of expansion greater than that of the insulative cylindrical member. The dimension of the trigger electric discharge gap is given as the dimension of the gap between the trigger electrodes which is produced due to the difference in the thermal coefficient of expansion between the pair of main electrodes and an insulative cylindrical member when the trigger electrodes are caused to contact each other by zeroing the gap therebetween and, in this state, the pair of main electrodes are hermetically mounted, by fusion of the low melting point metal, onto both end openings, respectively, of the insulative cylindrical member and, thereafter, the resultant unit is cooled down to room temperature.

14 Claims, 4 Drawing Figures

ANTI-OVERVOLTAGE PROTECTOR

BACKGROUND OF THE INVENTION

The present invention relates to an anti-overvoltage protector of a gas-carrying discharge tube type which is intended to protect electric appliances, etc. connected to an electric line against, for example, a high surge voltage and, more particularly, to an anti-overvoltage protector which is equipped with trigger electrodes for improving the delay in the discharge operation of the anti-overvoltage protector which occurs when an overvoltage has been applied thereto.

In order to protect electric appliances, etc. connected to an electric line against, or from, the high surge voltage or the like induced thereinto, an anti-overvoltage protector like a gas-carrying discharge tube is disposed between the electric line and the earth. In this type of anti-overvoltage protector, when a high surge voltage has been applied thereto, a time delay in the commencement of its discharge operation would result in the failure to protect the electric appliances against such surge voltage, in some cases. To prevent such time delay in the commencement of the discharge operation, for example, U.S. Pat. No. 3,588,576 discloses in its specification an anti-overvoltage protector of the type wherein a trigger discharge gap having a concentrated potential gradient is formed in the vicinity of the main electrodes effecting the discharge operation of the protector; and when a high surge voltage or the like has been applied to the protector, the resultant discharge operation in that trigger discharge gap causes a concentrated potential gradient to occur in the vicinity of the main electrodes, thereby hastening the commencement of the discharge which occurs between the main electrodes. The anti-overvoltage protector disclosed in the U.S. patent specification is one which comprises a hollow cylindrical member formed of insulating material such as ceramics, glass, etc., a pair of main electrodes hermetically mounted onto both end openings of the hollow cylindrical member so as to form a closed chamber therein and having their discharge surfaces opposed, within the hollow cylindrical member, to each other with a gap interposed therebetween, and a slender conductive layer extending, within an ionizing region of said gap, along the inner wall surface of the hollow cylindrical member and axially of this member. In this anti-overvoltage protector, when a high surge voltage is applied thereto, an electric field is concentrated in the trigger discharge gap between the end of the slender conductive layer and its opposed electrode, whereby the gas existing in the ionizing region of the discharge gap between the main electrodes is ionized, thereby hastening the commencement of the discharge between the main electrodes. The slender conductive layer of the anti-overvoltage protector disclosed in the U.S. Patent Specification is disposed such that it is conductively connected to one of the main electrodes and extends to the other of the main electrodes and this extension terminates in such a manner that it opposes the other main electrode with a gap greater than the discharge gap between the main electrodes, interposed therebetween. Further, for example, U.S. Pat. No. 3,989,985 discloses in its specification another anti-overvoltage protector which is arranged so as to hasten the commencement of the discharge between the main electrodes by using a slender conductive layer similar to that which is disclosed in the U.S. Pat. No. 3,588,576.

This other anti-overvoltage protector is the same as the one which is disclosed in the U.S. Pat. No. 3,588,576 excepting that the slender conductive layer is conductively connected to one of the main electrodes and extends to the other of the main electrodes beyond the discharge gap between the main electrodes and this extended portion opposes the other of the main electrodes with a gap greater than the discharge gap between the main electrodes, interposed between both. However, it is extremely difficult to form with high precision the slender conductive layer disclosed in these U.S. patent specifications, on the inner wall surface of the hollow cylindrical member in such a manner that the gap between the slender conductive layer and its opposed main electrode is greater than the discharge gap between the main electrodes. Further, since a limitation is imposed upon the precision with which various parts or members constituting the anti-overvoltage protector are fabricated, limitation is also imposed upon the dimensional accuracy of the discharge gap. For example, it is extremely difficult to form a discharge gap of 0.3 mm or less with high accuracy. For this reason, there arises the problems that the surge voltage response characteristic of the anti-overvoltage protector deteriorates, or variations in the discharge characteristic are liable to be produced.

Further, the following anti-overvoltage protector is known as an anti-overvoltage protector having a trigger discharge gap, other than the ones which have been mentioned above. That is to say, a recess is provided in each discharge surface of a pair of main electrodes opposing each other, and an insulating bar formed of, for example, ceramic material is provided in such a manner that it is fixedly clamped, in the recess, between the main electrodes, and an annular groove having a width smaller than the discharge gap between the main electrodes is provided in the circumferential surface of a substantially central portion of its axial length, and a conductive layer which is conductively connected to the main electrodes is applied onto the whole outer surface of the insulating bar excluding that which corresponds to the annular groove, whereby the commencement of the discharge between the main electrodes is promoted by using the annular groove as a trigger discharge gap.

In the above-mentioned anti-overvoltage protector wherein the narrow annular groove provided in the outer surface of the insulating bar is used as the trigger discharge gap, since the insulating bar is formed of an insulating material having high heat resistance such as ceramics, the use of a special fabricator such as, for example, a laser fabricator is required to form such a narrow annular groove. Further, since the annular groove has a very narrow width, when forming the conductive layer on the whole outer surface portion of the insulating bar excluding the surface portion which corresponds to the annular groove, the conductive layer is formed on this groove as well. For this reason, sufficient care is required to be taken so as not to cause the trigger discharge gap to be shortcircuited. Accordingly, the working efficiency is decreased and the cost involved is increased.

SUMMARY OF THE INVENTION

In view of the above, an object of the present invention is to provide an anti-overvoltage protector which enables the formation of a highly precise and very narrow trigger discharge gap having a width of, for example, 0.3 mm or less.

Another object of the present invention is to provide an anti-overvoltage protector which has an improved surge voltage response characteristic and which is capable of preventing the occurrence of variations in the discharge characteristic.

Still another object of the present invention is to provide an anti-overvoltage protector which enables its various constituent members or parts to be easily fabricated and assembled.

To attain the above object, the anti-overvoltage protector according to the present invention comprises a hollow cylindrical member formed of insulating material, a pair of main electrodes which are each formed of an electrically conductive material having a thermal coefficient of expansion greater than that of the hollow cylindrical member and which are hermetically mounted, by fusion of metal having a low melting point, onto both end openings, of the hollow cylindrical member and which have their main discharge surfaces opposed, in the hollow cylindrical member, to each other with a gap interposed therebetween, a recess portion which is formed in the main discharge surface of at least one of the pair of main electrodes, and a pair of trigger electrodes which are conductively connected to the pair of main electrodes respectively and which are opposed, in the recess, to each other to form a trigger discharge gap, whereby the dimension of the trigger discharge gap is given as the dimension of the gap between the trigger electrodes which is produced due to the difference in the thermal coefficient of expansion between the paired main electrodes and the hollow cylindrical member when the trigger electrodes are allowed to contact each other by zeroing the gap therebetween and, in this state, the paired main electrodes are hermetically mounted, by the fusion of metal having a low melting point, onto both of the end openings, of the hollow cylindrical member and, thereafter, the resultant unit is cooled down to room temperature.

According to the present invention, the pair of main electrodes are formed of electrically conductive material having a thermal coefficient of expansion greater than that of the material constituting the hollow cylindrical member, and the recess is formed in the electric discharge surface of at least one of the main electrodes. In this recess, the trigger electrodes are disposed in such a manner that they are connected respectively to the main electrodes and are opposed to each other. While the electric discharge surfaces, opposing each other, of the trigger electrodes are allowed to contact each other by zeroing the electric discharge gap therebetween, the main electrodes are hermetically mounted, by fusion of metal having a low melting point, onto both of the end openings of the hollow cylindrical member. Thereafter, the resultant unit is cooled down to room temperature, whereby a very narrow gap having a width of 0.3 mm or less, for example, about 0.05 mm is formed between the two opposing electric discharge surfaces of the trigger electrodes, to thereby form the trigger discharge gap. Thus, the highly precise and extremely narrow trigger discharge gap is easily obtained without being affected by the dimensional accuracy of the constituent parts of the anti-overvoltage protector. Accordingly, the surge voltage response characteristic is improved and at the same time the variations in the discharge characteristic are prevented from being produced. Further, the manufacture and assembling of the various constituent parts of the protector are facilitated. Thus, the problems which are involved in the prior art anti-overvoltage protector have been solved.

DETAILED DESCRIPTION OF THE PREFERRED EMBODIMENTS

Figure 1:
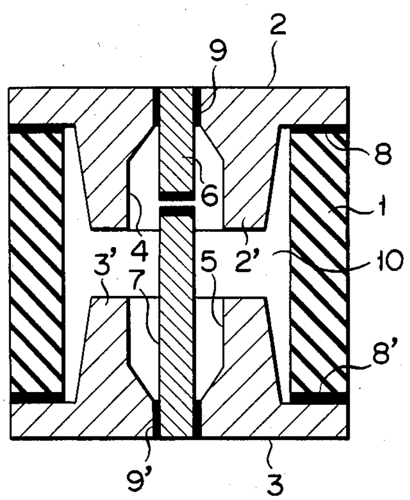
FIG. 1 is a vertical sectional view showing the construction of an anti-overvoltage protector according to an embodiment of the present invention.

Referring to FIG. 1, a reference numeral 1 denotes a hollow cylindrical member which is formed of an insulating material such as, for example, ceramics, glass, etc. Reference numerals 2 and 3 denote a pair of main electrodes which are formed of electrically conductive material such as copper having a thermal coefficient of expansion greater than that of the insulating material constituting the hollow cylindrical member 1. The pair of main electrodes 2 and 3 are hermetically mounted onto both of the end openings of the hollow cylindrical member 1, by fusion of metal having a low melting point, for example, of silver solder 8 and 8', to thereby form an enclosed chamber 10. The main electrodes 2 and 3 have their main electric discharge surfaces 2' and 3' opposing each other in the enclosed chamber 10 in such a manner that both form a main electric discharge gap therebetween. The main electric discharge surfaces 2' and 3' are formed with recessed portions 4 and 5 at their central parts, respectively. In these recessed portions 4 and 5, there are provided a pair of rod-like trigger electrodes which are formed of an electrically conductive material such as copper and which are conductively and hermetically fused, by silver solders 9 and 9', onto the pair of main electrodes 2 and 3, respectively, and which are allowed to oppose each other in one of the recessed portions 4 and 5 (portion 4, in this case) to thereby form a very narrow trigger discharge gap.

The anti-overvoltage protector according to an embodiment of the present invention which is shown in FIG. 1 is assembled through the following process.

First of all, the main electrodes 2 and 3 are hermetically sealed onto the both end openings of the hollow cylindrical member 1, respectively, by fusion of sliver solders 8 and 8' in such a manner that the main electric discharge surfaces 2' and 3' of the main electrodes 2 and 3 oppose each other in the hollow cylindrical member 1 with a gap interposed therebetween. At the time of sealing, although the main electric discharge surfaces 2' and 3' are disposed beforehand such that a predetermined main electric discharge gap is provided therebetween, the pair of trigger electrodes 6 and 7 is disposed such that the trigger discharge gap is made zero in the recessed portion 4. This sealing operation is carried out by heating the assembled members of the anti-overvoltage protector in a heating furnace in which is received an inert gas such as argon, krypton or the like and fusing the silver solder 8 and 8' and hermetically sealing the members involved, to each other. When the anti-overvoltage protector thus subjected to the sealing operation has been cooled down to room temperature, the electric discharge surfaces constituting the trigger discharge gap which have theretofore been contacted with each other are separated from each other due to the difference in the thermal coefficient of expansion between the hollow cylindrical member 1 and the pair of main electrodes 2 and 3. Thus, a very narrow trigger discharge gap having a width of, for example, 0.05 mm or so is formed. In this case, although the dimension of the main electric discharge gap between the pair of main electrodes 2 and 3 is also slightly varied due to the difference in the thermal coefficient of expansion between the main electrodes and the hollow cylindrical member 1, since the amount of this variation is very small as compared with the dimension of the main electric discharge gap, such variation has no effect upon the discharge characteristic of the anti-overvoltage protector, at all. Further, it is possible, previous to performing the sealing operation, to make the dimension of the main electric discharge gap one which is increased or decreased by an estimated dimension corresponding to such variation.

Next, the results of the experiments performed on the anti-overvoltage protector according to the embodiment of the present invention will be described below. The pair of main electrodes 2 and 3 were prepared from copper and copper rods were used as the pair of trigger electrodes 6 and 7, respectively. The hollow cylindrical member 1 was prepared from alumina-ceramic and eutectic silver solders having a melting temperature of 780° C. to 830° C. were used as the silver solders 8, 8′ and 9, 9′. Further, the length of the copper rods used as the trigger electrodes 6 and 7 was made 4 mm, the length of the alumina ceramic constituting the hollow cylindrical member 1 was made 4 mm, and the axial length of the anti-overvoltage protector was made 6 mm. Since the linear coefficient of expansion of the copper rods is $16.7\times10^{6}$ and the linear coefficient of expansion of the alumina ceramic is $7.5\times10^{6}$, the dimension of the trigger electric discharge gap formed between the trigger electrodes 6 and 7 becomes 0.05 mm. Thus, a very small trigger electric discharge gap was obtained. In this connection, when the length of the copper rods is made shorter than said length of 4 mm as shown in other embodiments shown in FIGS. 2 and 3 for example, a further narrower trigger discharge gap of less than 0.05 mm is obtained.

The operation or action of the anti-overvoltage protector according to the embodiment of the present invention will now be described.

Where the main electric discharge gap between the pair of main electrodes 2 and 3 of the anti-overvoltage protector according to this first embodiment of the present invention is 1 mm and the trigger electric discharge gap between the pair of trigger electrodes 6 and 7 is 0.05 mm, application of a surge voltage of, for example, 300 V across the pair of main electrodes 2 and 3 results in that a voltage of 60 KV/cm is applied across the pair of trigger electrodes 6 and 7. Thus, a voltage of 3 KV/cm is applied across the pair of main electrodes 2 and 3. Thus, an intense electric field is formed in the trigger discharge gap between the pair of trigger electrodes 6 and 7, whereby the gas existing in this gap is ionized to perform the discharge operation. When the electric current discharged due to this discharge operation is increased, the amount of the gas ionized is also increased with the result that the gas existing in the main electric discharge gap between the pair of main electrodes 2 and 3 is also ionized. Thus, the electric discharge between the pair of trigger electrodes 6 and 7 is transferred to the electric discharge between the pair of main electrodes 2 and 3. When it is desired to facilitate the switch-over of electric discharge to the pair of main electrodes 2 and 3, it is sufficient to provide a substance with a low work function such as, alkali, alkaline earth metal, or a compound of these on the main electric discharge surfaces 2′ and 3′ of the pair of main electrodes 2 and 3, to thereby make the amount of secondary electrons released from the main electric discharge surfaces 2′ and 3′ greater than the amount of secondary electrons liberated from the trigger electric discharge surfaces of the pair of trigger electrodes 6 and 7. When the electric discharge is switched over to the pair of main electrodes 2 and 3, the voltage applied thereacross is caused to drop. Thus, the surge voltage is absorbed. According to the above-mentioned first embodiment of the present invention, the trigger electrodes 6 and 7 are disposed in the recessed portions 4 and 5 provided in the central part of the main electric discharge surfaces 2′ and 3′ and the trigger electric discharge surfaces are opposed to each other in one recessed portion 4. Therefore, it is possible to prevent the electrode substances which have been sputtered due to the electric discharge between the main electric discharge surfaces 2′ and 3′, from attaching onto the trigger electric discharge surfaces constituting the trigger electric discharge gap, whereby the deterioration of the trigger electric discharge surfaces is prevented.

Further, according to the above-mentioned first embodiment of the present invention, the trigger electric discharge gap between the pair of trigger electrodes 6 and 7 can be formed into a highly precise and extremely narrow gap due to the difference in the thermal coefficient of expansion between the hollow cylindrical member 1 and the pair of main electrodes 2 and 3 without being affected by the dimensional accuracy of the constituent parts of the protector. Therefore, it is possible not only to lower the electric-discharge commencing voltage Vs (DC voltage) with respect to the anti-overvoltage protector but also to lower the electric-discharge commencing voltage Vss against the impulse waves. Namely, it is possible to remarkably improve the Vs and Vss characteristic of the anti-overvoltage protector. Further, since as mentioned above the trigger electric discharge gap is given in the form of an extremely narrow gap, that trigger electric discharge gap operates as a secondary air gap when trouble has occurred, for example, the anti-overvoltage protector has broken down and air enters this protector. For this reason, it becomes unnecessary to connect another air gap in parallel to the anti-overvoltage protector as in the prior art, with the result that the structure of the protector is simplified.

Figure 2:
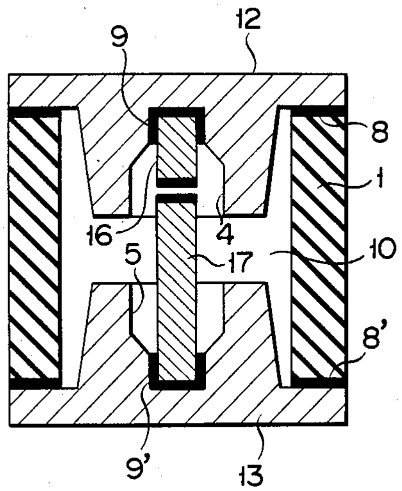
FIG. 2 is a vertical sectional view showing the construction of an anti-overvoltage protector according to another embodiment of the present invention.
Figure 3:
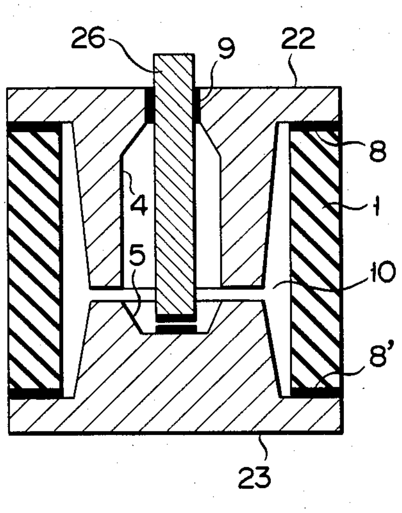
FIG. 3 is a vertical sectional view showing the construction of an anti-overvoltage protector according to still another embodiment of the present invention.
Figure 4:
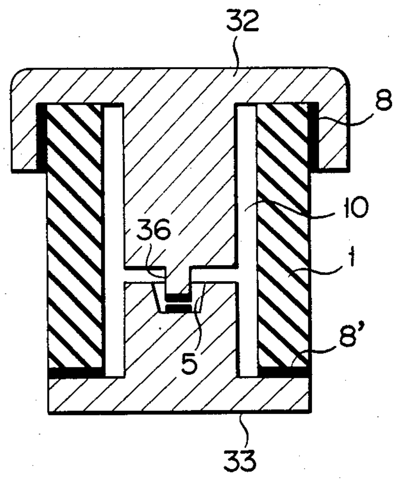
FIG. 4 is a vertical sectional view showing the construction of an anti-overvoltage protector according to a further embodiment of the present invention.

FIGS. 2 to 4 are vertical sectional views showing the constructions of anti-overvoltage protectors according to other embodiments of the present invention. For convenience of explanation, the parts and sections which are similar to those shown in FIG. 1 are denoted by like reference numerals and their description is omitted.

The anti-overvoltage protector shown in FIG. 2 differs from that which is shown in FIG. 1 in the following respects. That is, while, in FIG. 1, the pair of trigger electrodes 6 and 7 which are fused in the recessed portions 4 and 5, respectively, of the pair of main electrodes 2 and 3, in such a manner that they pierce these main electrodes 2 and 3, in FIG. 2 the pair of trigger electrodes 6 and 7 are fused to the bottom surfaces of the recessed portions 4 and 5, respectively, which are formed in the pair of main electrodes 12 and 13 without being allowed to pierce these main electrodes 12 and 13. The constructions of the protectors are the same in all other aspects.

The anti-overvoltage protector shown in FIG. 3 differs from that which is shown in FIG. 1 in the following respects. That is, in FIG. 3, one end of one trigger electrode 26 is externally allowed to protrude from its corresponding main electrode 22 while, on the other hand, the other end of that trigger electrode 26 is allowed to protrude into the recessed portion 5 of the other main electrode 23 to oppose the bottom surface of the recessed portion 5, thereby to form a trigger electric discharge gap between the trigger electrode 26 and the main electrode 23. The remaining constructions of the anti-overvoltage protector shown in FIG. 3 are the same as those of FIG. 1 and their description is omitted.

The anti-overvoltage protector shown in FIG. 4 differs from that which is shown in FIG. 1 in the following respects. That is, in FIG. 4, the main electric discharge surface of one main electrode 32 is formed, at its central part, with a projection protruding into the recessed portion 5 of the other main electrode 33, said projection being used as one trigger electrode 36. The trigger electrode 36 is opposes the bottom surface of the recessed portion 5 to form a trigger electric discharge gap between the trigger electrode 36 and the main electrode 33. Both are the same in the remaining constructions and the description thereof is omitted.

The assembling operations for, and the action or effect of, the anti-overvoltage protectors according to the second and fourth embodiments of the present invention which are shown in FIGS. 2 to 4 respectively are the same as those which were stated in connection with FIG. 1, and their description is omitted.

Note the following. Since the trigger electric discharge gap obtained in each of the first to fourth embodiments of the present invention which are illustrated in FIGS. 1 to 4 is extremely narrow, as stated previously, the trigger electric discharge surface is likely to be melted due to the heat generated when the trigger electric discharge occurs. When it is desired to avoid that discharge surface from being melted, it is sufficient to form a coating layer consisting of a heat resistant and electrically conductive material such as tungsten, on the trigger electric discharge surface. Further, the main electrode and the trigger electrode can be formed of the same or different electrically conductive materials.

As has above been described, according to the present invention, the highly precise and extremely narrow trigger electric discharge gap can easily be formed by utilizing the difference in the thermal coefficiency of expansion between the pair of main electrodes and the insulating hollow cylindrical member without being affected by the dimensional accuracy of the constituent parts of the anti-overvoltage protector, thereby lowering the electric-discharge commencing voltages Vs and Vss with respect to the anti-overvoltage protector. Thus, the surge voltage response characteristic of the protector can be improved and at the same time the production of variations in the electric discharge characteristic thereof can be prevented. Further, the fabrication and assembling of the constituent parts is easier to obtain, thus reducing the cost of the product. Further, since, according to the present invention, the trigger electrodes and the trigger electric discharge gap are disposed in the recessed portion formed in the main electric discharge surfaces of the main electrodes, the substances which have been sputtered from the main electric discharge surfaces due to the main electric discharge therebetween are effectively prevented from attaching onto the trigger electric discharge surfaces of the trigger electrodes and thereby deteriorating the trigger electric discharge characteristic. Further, since the trigger electric discharge gap is extremely narrow the trigger electric discharge gap can operate as a secondary air gap, for example when the anti-overvoltage protector has been broken and air enters the interior thereof. For this reason, it becomes unnecessary to connect a separate air gap in parallel to the anti-overvoltage protector as in the prior art. Thus, the structure of the anti-overvoltage protector is simplified. The effects mentioned above are among the advantages of the present invention.

What is claimed is:

1. An anti-overvoltage protector comprising a hollow cylindrical member formed of insulating material, a pair of main electrodes which are each formed of an electrically conductive material having a thermal coefficient of expansion greater than that of said hollow cylindrical member and which are hermetically mounted, by fusion of metal having a low melting point, onto both end openings, of said hollow cylindrical member and which have their main discharge surfaces opposed, in said hollow cylindrical member, to each other with a gap interposed therebetween, a recess portion which is formed in said main discharge surface of at least one of said pair of main electrodes, and a pair of trigger electrodes which are conductively connected to said pair of main electrodes respectively and which are opposed, in said recess portion, to each other to form a trigger discharge gap, whereby the dimension of said trigger discharge gap is given as the dimension of said gap between said trigger electrodes which is produced due to the difference in the thermal coefficients of expansion between said pair of main electrodes and said hollow cylindrical member when said trigger electrodes are allowed to contact each other by zeroing the gap therebetween and, in this state, said pair of main electrodes are hermetically mounted, by fusion of metal having a low melting point, onto both end openings of said hollow cylindrical member and, thereafter, the resultant unit is cooled down to room temperature.

2. An anti-overvoltage protector according to claim 1, wherein said pair of trigger electrodes are caused to pierce said pair of main electrodes, and are fused to these main electrodes.

3. An anti-overvoltage protector according to claim 1, including one recess portion in each of said main electrodes and wherein said pair of trigger electrodes are fused to the bottom surfaces of each of said recess portions, which are formed in said pair of main electrodes.

4. An anti-overvoltage protector according to claim 1, including one recess portion in each of said main electrodes and wherein one end of one of said pair of trigger electrodes is caused to pierce one of the corresponding pair of main electrodes and to protrude externally from the same; and the other end of said one trigger electrode is caused to protrude into the recess portion of the other of said pair of main electrodes whereby said other end of said one trigger electrode is caused to oppose a surface of the other trigger electrode which is formed on the bottom of said recess portion of said other of said pair of main electrodes to thereby form a trigger electric discharge gap therebetween.

5. An anti-overvoltage protector according to claim 1, wherein one of said pair of trigger electrodes is formed on the central part of a main electric discharge surface of one of said pair of main electrodes and said recess is formed in said other of said pair of main electrodes, said one of said pair of trigger electrodes protruding into the recess portion of the other of said pair of main electrodes, whereby said one of said pair of trigger electrodes and the other trigger electrode which is formed on the bottom surface of the recess portion of said other main electrode are caused to oppose each other to thereby form a trigger electric discharge gap therebetween.

6. An anti-overvoltage protector according to any one of the preceding claims 1 to 5, wherein a coating layer consisting of a heat resistant and electrically conductive material such as tungsten is formed on each of the respective trigger electric discharge surfaces of said pair of trigger electrodes.

7. An anti-overvoltage protector according to any one of claims 1 to 5, wherein said pair of main electrodes and said pair of trigger electrodes are formed of the same electrically conductive materials.

8. An anti-overvoltage protector according to any one of claims 1 to 5, wherein said pair of main electrodes and said pair of trigger electrodes are formed of different electrically conductive materials.

9. An anti-overvoltage protector according to any one of claims 1 to 5, wherein said trigger electric discharge gap is less than the discharge gap between said main electrodes.

10. An anti-overvoltage protector according to any one of claims 1 to 5, wherein said trigger electric discharge gap between said pair of trigger electrodes has a width of 0.3 mm or less.

11. An anti-overvoltage protector according to any one of claims 1 to 5, wherein said trigger electric discharge gap between said pair of trigger electrodes has a width of 0.05 mm.

12. An anti-overvoltage protector according to claim 1, wherein the sealing of said hollow cylindrical member and said pair of main electrodes is performed by heating said hollow cylindrical member and said pair of main electrodes within a heating furnace in which there is received an inert gas such as argon, krypton, or the like and fusing silver solder at both end openings of said hollow cylindrical member to thereby hermetically seal said hollow cylindrical member and said pair of main electrodes to each other.

13. An anti-overvoltage protector according to claim 1, wherein said pair of main electrodes are made of copper, said pair of trigger electrodes are prepared from copper rods, said hollow cylindrical member is made of alumina ceramic, and a eutectic silver solder having a melting temperature of 780° C. to 830° C. is used as said low melting point metal.

14. An anti-overvoltage protector according to claim 1, wherein a substance with a low work function selected from the group consisting of alkali, alkaline earth metal, and compounds of these is caused to adhere onto the main electric discharge surfaces of said pair of main electrodes.

* * * * *